(12) United States Patent
Okamoto et al.

(10) Patent No.: US 7,962,524 B2
(45) Date of Patent: Jun. 14, 2011

(54) COMPUTER PROGRAM, DEVICE, AND METHOD FOR SORTING DATASET RECORDS INTO GROUPS ACCORDING TO FREQUENT TREE

(75) Inventors: Seishi Okamoto, Kawasaki (JP);
Tatsuya Asai, Kawasaki (JP); Masataka Matsuura, Kawasaki (JP); Hiroya Hayashi, Kawasaki (JP); Masahiko Nagata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1050 days.

(21) Appl. No.: 11/298,511

(22) Filed: Dec. 12, 2005

(65) Prior Publication Data
US 2007/0005598 A1    Jan. 4, 2007

(30) Foreign Application Priority Data

Jun. 29, 2005  (JP) ................................. 2005-189592

(51) Int. Cl.
*G06F 7/00*  (2006.01)
(52) U.S. Cl. .......................... 707/797; 707/791; 707/790
(58) Field of Classification Search .................. 707/797, 707/791, 790
See application file for complete search history.

(56) References Cited

U.S. PATENT DOCUMENTS

| 6,618,725 | B1* | 9/2003 | Fukuda et al. ..................... 707/6 |
| 7,249,129 | B2* | 7/2007 | Cookson et al. ................... 707/5 |
| 7,287,028 | B2* | 10/2007 | Lee .................................... 707/6 |
| 2003/0014408 | A1* | 1/2003 | Robertson .......................... 707/6 |
| 2003/0028531 | A1* | 2/2003 | Han et al. ........................... 707/6 |
| 2003/0174179 | A1* | 9/2003 | Suermondt et al. ........... 345/853 |
| 2005/0192960 | A1* | 9/2005 | Inakoshi et al. ................... 707/6 |
| 2006/0129515 | A1 | 6/2006 | Nagata et al. |

FOREIGN PATENT DOCUMENTS

JP     2006-171800 A     6/2006

OTHER PUBLICATIONS

Machine Translastion of WO 2004/040477 by Inakoshi et al. dated May 2004.*
Patent Abstracts of Japan, Publication No. 10-161991, Published Jun. 19, 1998.
Patent Abstracts of Japan, Publication No. 2002-108844, Published Apr. 12, 2002.

* cited by examiner

*Primary Examiner* — Tim T. Vo
*Assistant Examiner* — Mahesh H Dwivedi
(74) *Attorney, Agent, or Firm* — Fujitsu Patent Center

(57) ABSTRACT

A computer-readable storage medium storing a dataset sorting program is provided to sort records in a dataset into a plurality of destination groups according to a given key item specification. An item value extractor creates an item value list for every record. Then a frequent tree builder builds a frequent tree from the item value lists by finding patterns of item values that appear more often than a threshold specified by a given growth rate parameter. Each item value pattern is a leading part of an item value list with a variable length. A destination group mapper associates each node of the frequent tree with one of the plurality of destination groups. A record sorter traces the frequent tree according to the item value list of each given record, and upon reaching a particular node, puts the record into the destination group associated with that node.

9 Claims, 15 Drawing Sheets

20 XML DATA

```
<?xmlversion="1.0"encoding="Shift_JIS"?>
<SALES_MANAGEMENT>
  <SALES_INFORMATION SALES_DATE="2005.03.01">
    <CUSTOMER ID="13579">
      <ADDRESS>
        <DISTRICT>YAMAGUCHI</DISTRICT>
        <CITY>SHIMONOSEKICITY</CITY>
      </ADDRESS>
      <AGE>38</AGE>
      <SEX>MALE</SEX>
    </CUSTOMER>
    <PRODUCT ID="1234567">
      <PRODUCT_NAME>NOTEBOOK COMPUTER</PRODUCT_NAME>
      <AMOUNT>200000</AMOUNT>
    </PRODUCT>
  </SALES_INFORMATION>
  <SALES_INFORMATION SALES_DATE="2005.03.01">
    <CUSTOMER ID="24680">
      <ADDRESS>
        <DISTRICT>TOKYO</DISTRICT>
        <CITY>CHUOU WARD</CITY>
      </ADDRESS>
      <AGE>35</AGE>
      <SEX>MALE</SEX>
    </CUSTOMER>
    <PRODUCT ID="1234568">
      <PRODUCT_NAME>DESKTOP COMPUTER</PRODUCT_NAME>
      <AMOUNT>380000</AMOUNT>
    </PRODUCT>
  </SALES_INFORMATION>
       .
       .
       .
</SALES_MANAGEMENT>
```

The first SALES_INFORMATION block is labeled 21; the second is labeled 22.

FIG. 4

COMPUTER PROGRAM, DEVICE, AND METHOD FOR SORTING DATASET RECORDS INTO GROUPS ACCORDING TO FREQUENT TREE

CROSS-REFERENCE TO RELATED APPLICATIONS

This application is based upon and claims the benefits of priority from the prior Japanese Patent Application No. 2005-189592, filed on Jun. 29, 2005, the entire contents of which are incorporated herein by reference.

BACKGROUND OF THE INVENTION

1. Field of the Invention

The present invention relates to a computer-readable storage medium storing a program for sorting a large number of database records into a plurality of groups. More particularly, the present invention relates to a computer-readable storage medium storing a dataset sorting program for sorting records in a dataset in a manner suitable for counting and summarizing data records. The present invention also relates to a dataset sorting device and a dataset sorting method providing the features stated above.

2. Description of the Related Art

Database systems are widely used in the operations of businesses. A database system maintains various pieces of data, and the user summarizes data values accumulated in a database, when necessary. Here, the summarization of data values refers to a series of computational operations to obtain the number of occurrences (or frequency) of each different item value and compile the results into a summary report. The summarization is one of the most important fundamental processes for analysis and utilization of data.

One of the most desired features for such summarization processes is a capability of handling large-scale data at high speeds. As the use of computers becomes widespread and network systems are widely deployed in recent years, large amounts of data are accumulated in distributed locations. Accordingly the volume of data that needs to be summarized goes on increasing, and therefore, the development of high-speed summarization techniques capable of handling a large amount of data is becoming more and more important.

Also, in recent years, XML (Extensible Markup Language) data has rapidly come into widespread use. XML offers higher flexibility in changing data itself and modifying data definitions and data structures. This trend has led to a demand for data summarizing techniques that can be applied, not only to structured data such as those handled by conventional RDB (Relational Database) systems or the like, but also to the newly emerged XML-formatted data.

To perform high-speed processing on large-scale data, a plurality of datasets are divided into a plurality of data groups, and a summarizing process is performed on those divided data groups. Conventional techniques to divide datasets include a method based on in which data is equally divided in the order that they are stored. According to this method, ten million records are divided into, for example, ten destination groups as they are stored, one million records in each group.

To summarize large-scale data divided by using the conventional sorting method based on storage order, some additional tasks for merging datasets are required. One example technique disclosed in Japanese Patent No. 2959497 first divides given data by using a storage order-based method. After that, it sorts and summarizes records in each divided dataset while merging the divided data subsets. Such a storage order-based sorting method has an advantage in that it can be applied easily to any kind of data as long as the data has some definite structure and can be divided into groups with an equal number of membership.

However, the conventional storage order-based method has a problem in that it does not take into consideration the distribution of data with respect to designated items, and therefore, resource-consuming merging tasks are subsequently required to summarize the data. For example, the technique disclosed in the above Japanese Patent 2959497, paragraph 0019, requires datasets to be sorted individually according to a specified key data item beforehand, and also requires sorting of data taken out of each dataset when merging the datasets.

A technique for summarizing bloated XML data is disclosed in Japanese Patent Application Publication No. 2002-108844. According to the technique disclosed in this patent application, the number of items (tags) and the number of occurrences of each particular item value are counted and the resulting count values are supplied to a user in list form. From that list, the user selects key items for sorting. A destination group is associated with every set of such selected item values, and the records in XML data are sorted according to those associations.

The method of the above publication No. 2002-108844 counts the items (tags) and occurrences of each item value independently for each individual item. This makes it difficult to take into consideration the data distribution of values of each item when sorting dataset records. Also, the disclosed technique requires high costs in sorting data as its data distribution changes in accordance with additions, updates, and deletions of data.

Yet another technique for summarizing XML data is disclosed in Japanese Patent Application Publication No. 2004-358947. According to this technique, information about items required for summarization is extracted out of one or more files of data records described in the XML format. Records are summarized by constructing a trie based on that extracted information.

The same publication No. 2004-358947 also discloses a data summarizing device that summarizes data records through a single-path scanning, thus achieving very high summarizing speeds. However, this conventional technique requires large main storage capacity in order to construct a trie data structure in proportion to the number of different key item values. This means that the conventional device has still another problem in that, when the device is applied to summarization of large-scale data, the performance of the device decreases due to the lack of sufficient memory space for computation.

SUMMARY OF THE INVENTION

In view of the foregoing, it is an object of the present invention to provide a computer-readable storage medium storing a dataset sorting program which is capable of effectively sorting dataset records according to specified key items. It is also an object of the present invention to provide a dataset sorting device and a dataset sorting method with the same feature.

To accomplish the above object, according to the present invention, there is provided a computer-readable storage medium storing a dataset sorting program to sort records of a dataset into a plurality of destination groups. The dataset sorting program causes a computer to function as the following elements: an item value extractor, a frequent tree builder, a destination group mapper, and a record sorter. The item value extractor creates an item value list of each record of the dataset by extracting item values of key items specified by a key item specification. This item value list contains item values arranged in the order specified by the key item specification. The frequent tree builder builds a frequent tree from the plurality of item value lists by finding patterns of item values that appear more often than a threshold specified by a growth rate parameter. Each pattern of item values is a leading part of an item value list with a variable length. The destination group mapper associates each node of the frequent tree with one of the plurality of destination groups. The record sorter traces the frequent tree according to the item value list of each given record, and upon reaching a particular node, puts the record into the destination group associated with that node.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 4 shows an example of XML data.

DESCRIPTION OF THE PREFERRED EMBODIMENTS

Figure 1:
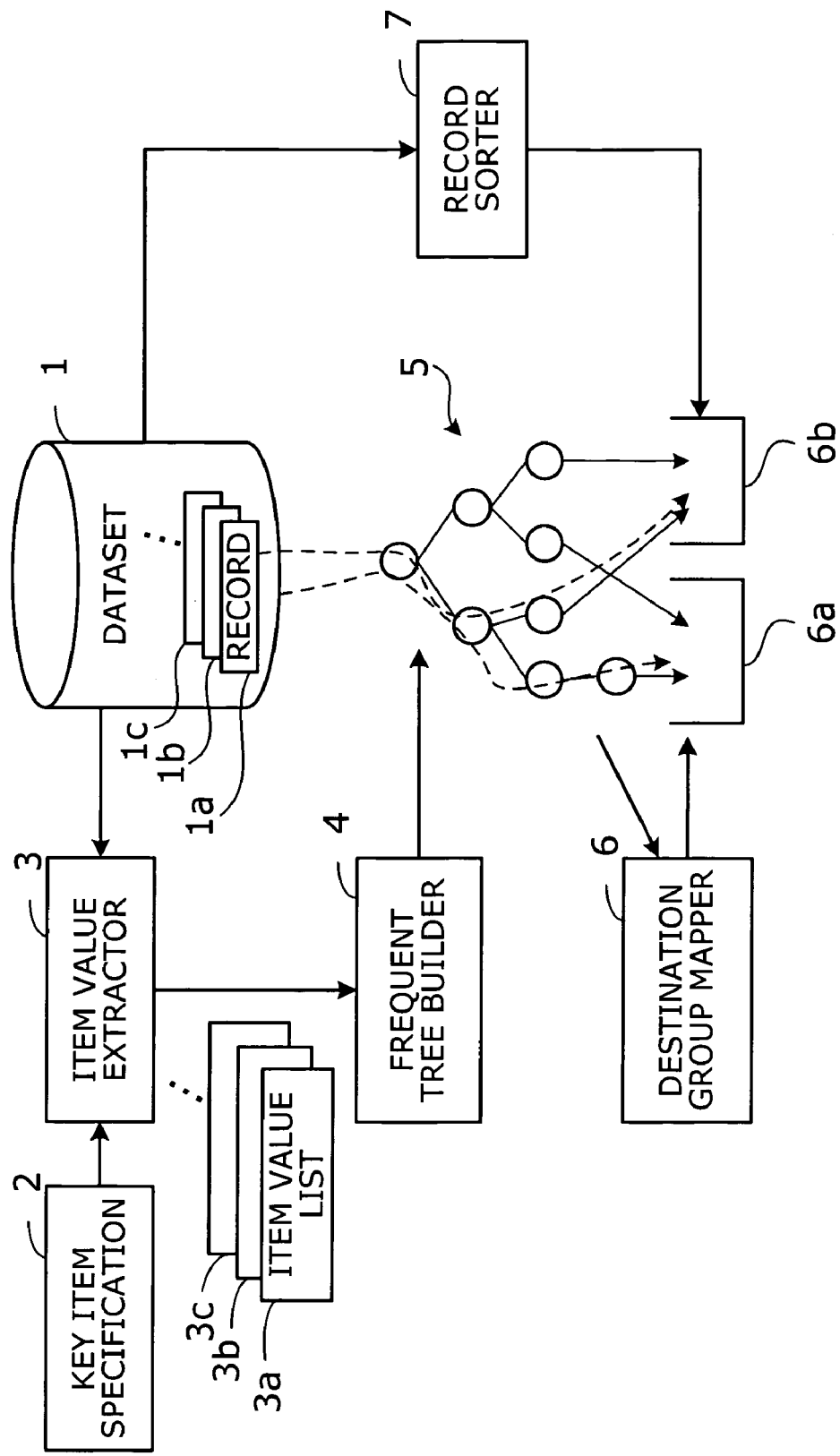
FIG. 1 gives an overview of an embodiment of the present invention.

Preferred embodiments of the present invention will be described below with reference to the accompanying drawings, wherein like reference numerals refer to like elements throughout.

FIG. 1 gives an overview of an embodiment of the present invention. Shown in FIG. 1 are a set of processing blocks which divide a plurality of records $1a$, $1b$, $1c$, ... of a dataset 1 into a plurality of destination groups, where each record contains values of a plurality of data items. The illustrated processing blocks include: an item value extractor 3, a frequent tree builder 4, a destination group mapper 6, and a record sorter 7. These blocks provide the following functions.

The item value extractor 3 extracts values of key items from each record $1a$, $1b$, $1c$, ... of the dataset 1 according to a given key item specification 2. The key item specification 2 contains a plurality of key items specifying how to sort records. Then, the item value extractor 3 creates item value lists $3a$, $3b$, $3c$ ... for the respective records $1a$, $1b$, $1c$, ..., in each of which item values are arranged in the order specified by the key item specification.

The frequent tree builder 4 compares a plurality of item value lists $3a$, $3b$, $3c$ ... with one another and finds patterns of item values which appear more often than a threshold specified by a growth rate parameter. Here each pattern is a leading part of an item value list, with a variable length. Then, the frequent tree builder 4 constructs a frequent tree 5 representing every such pattern of item values as a series of linked nodes.

The destination group mapper 6 associates each leaf node of the frequent tree 5 with one of a plurality of destination groups $6a$ and $6b$ according to a predetermined algorithm. Specifically, the destination group mapper 6 counts the number of records that pass or end at each particular node, and divides the nodes into groups in such a way that the membership of each group will be equalized. The resulting groups of nodes then form a plurality of destination groups of records.

The record sorter 7 traces the frequent tree 5 according to each item value list $3a$, $3b$, $3c$, and so on of the records $1a$, $1b$, $1c$, and so on. Each record reaches a particular node in the frequent tree 5. The record sorter 7 then puts each record $1a$, $1b$, $1c$, ... into one of the destination groups $6a$ and $6b$ associated with the node it can reach.

For example, the record sorter 7 assigns records having reached a particular leaf node of the frequent tree 5 to a destination group to which that leaf node belongs. Some records are, however, unable to reach lead nodes; they stop at a non-leaf node of the frequent tree 5. The record sorter 7 assigns such records to a destination group to which that non-leaf node belongs. More specifically, since such a non-leaf node should have a direct or indirect link to a leaf node, the record sorter 7 assigns records to the destination group corresponding to that leaf node.

In operation, the item value extractor 3 extracts item values from records $1a$, $1b$, $1c$, ... in the dataset 1 to create their item value lists $3a$, $3b$, $3c$, ... on the basis of a given key item specification. The frequent tree builder 4 then compares those item value lists $3a$, $3b$, $3c$, ... with one another in an attempt to find patterns of leading item values which appear more often than a threshold specified by a growth rate parameter. Constructed from those patterns is a frequent tree 5, which represents every leading sequence of item values that is found, as a series of nodes connected by links, or edges. The destination group mapper 6 maps leaf nodes of the frequent tree 5 onto a plurality of destination groups $6a$ and $6b$. The record sorter 7 subjects each record $1a$, $1b$, $1c$, ... to the frequent tree 5 according to its corresponding item value list $3a$, $3b$, $3c$, ... to find which node of the frequent tree 5 the record in question can reach. Every record $1a$, $1b$, $1c$, ... is thus assigned to one of the plurality of destination groups $6a$ and $6b$ depending on which node it actually reaches. In this way, dataset records having the same values in the data items specified by a given key item specification will be sorted into the same destination group.

The frequent tree 5 is relatively simple since it is formed only from frequently-appearing item values. For this reason, the task of building a frequent tree 5 requires only a small amount of memory even if the dataset contains a large amount of records $1a$, $1b$, $1c$, and so on.

Moreover, since the frequent tree 5 is based on specified key items, it is ensured that records having the same key item values are all assigned, without fail, to the same destination group. The divided records can therefore be summarized with respect to a particular combination of key items by simply summarizing a corresponding destination group, without the need for merging partial results. That is, since there is no need to identify records that belong to the same group or accumulate such records to compile a summarized result, the summarization task becomes more efficient.

A more specific embodiment of the present invention will now be described by using an example data summarizing device 100 which divides a dataset in the way described in FIG. 1. It is also assumed in the following embodiment that a large amount of data is stored in a file in the form of the XML.

Hardware Platform

Figure 2:
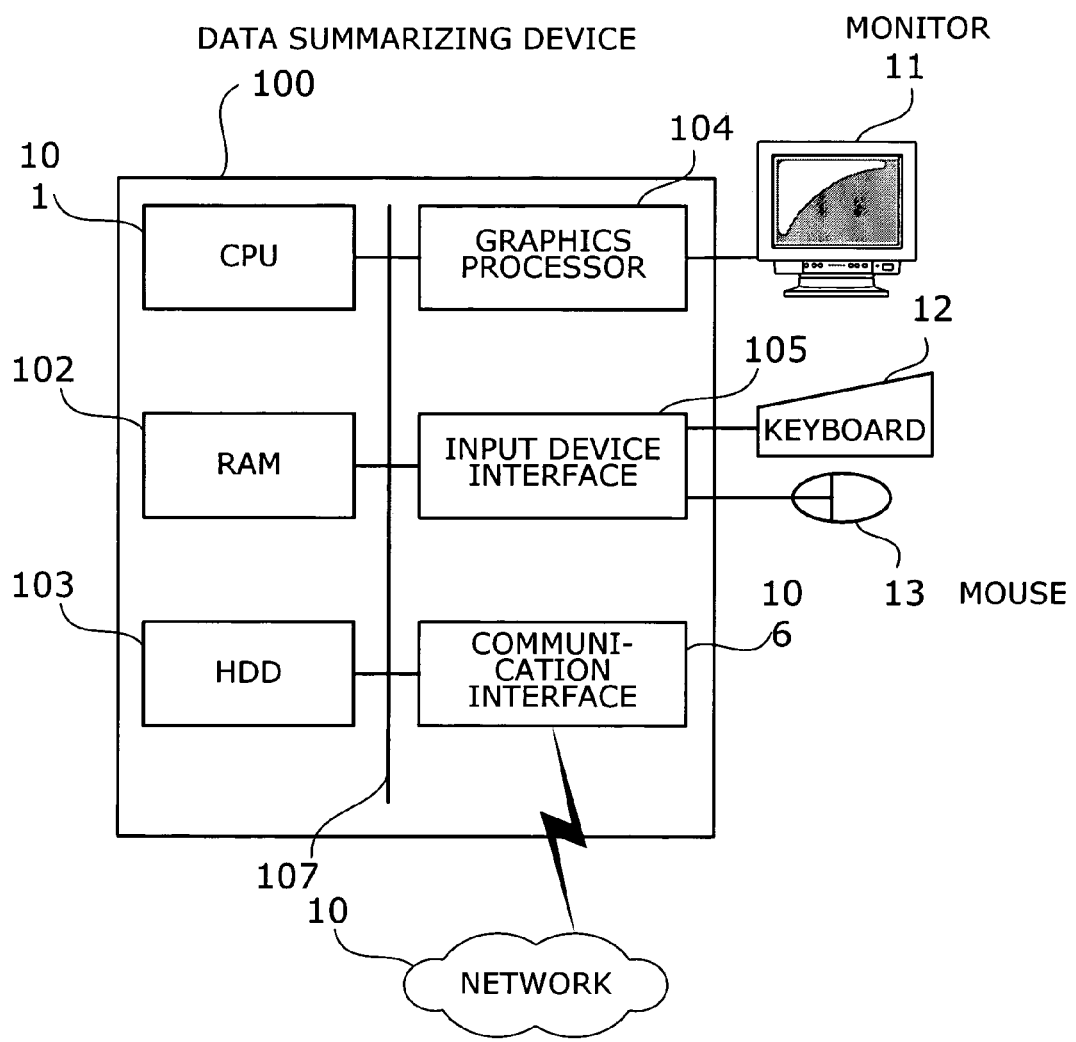
FIG. 2 shows an example hardware configuration of a computer platform for the embodiment of the present invention.

FIG. 2 shows an example hardware configuration of a computer platform for the embodiment of the present invention. The illustrated data summarizing device 100 has the following functional elements: a central processing unit (CPU) 101, a random access memory (RAM) 102, a hard disk drive (HDD) 103, a graphics processor 104, an input device interface 105, and a communication interface 106. The CPU 101 controls the entire computer system, interacting with other elements via a common bus 107. Besides serving as temporary storage for the whole or part of operating system (OS) programs and application programs that the CPU 101 executes, the RAM 102 stores various data objects manipulated at runtime. The HDD unit 103 stores program and data files of the operating system and various applications.

The graphics processor 104 produces video images in accordance with drawing commands from the CPU 101 and displays them on the screen of an external monitor 11 coupled thereto. The input device interface 105 is used to receive signals from external input devices, such as a keyboard 12 and a mouse 13. Those input signals are supplied to the CPU 101 via the bus 107. The communication interface 106 is connected to a network 10, allowing the CPU 101 to exchange data with other computers (not shown) on the network 10.

The computer system described above serves as a hardware platform for realizing the processing functions of the present embodiment.

Data Summarizing Device

Figure 3:
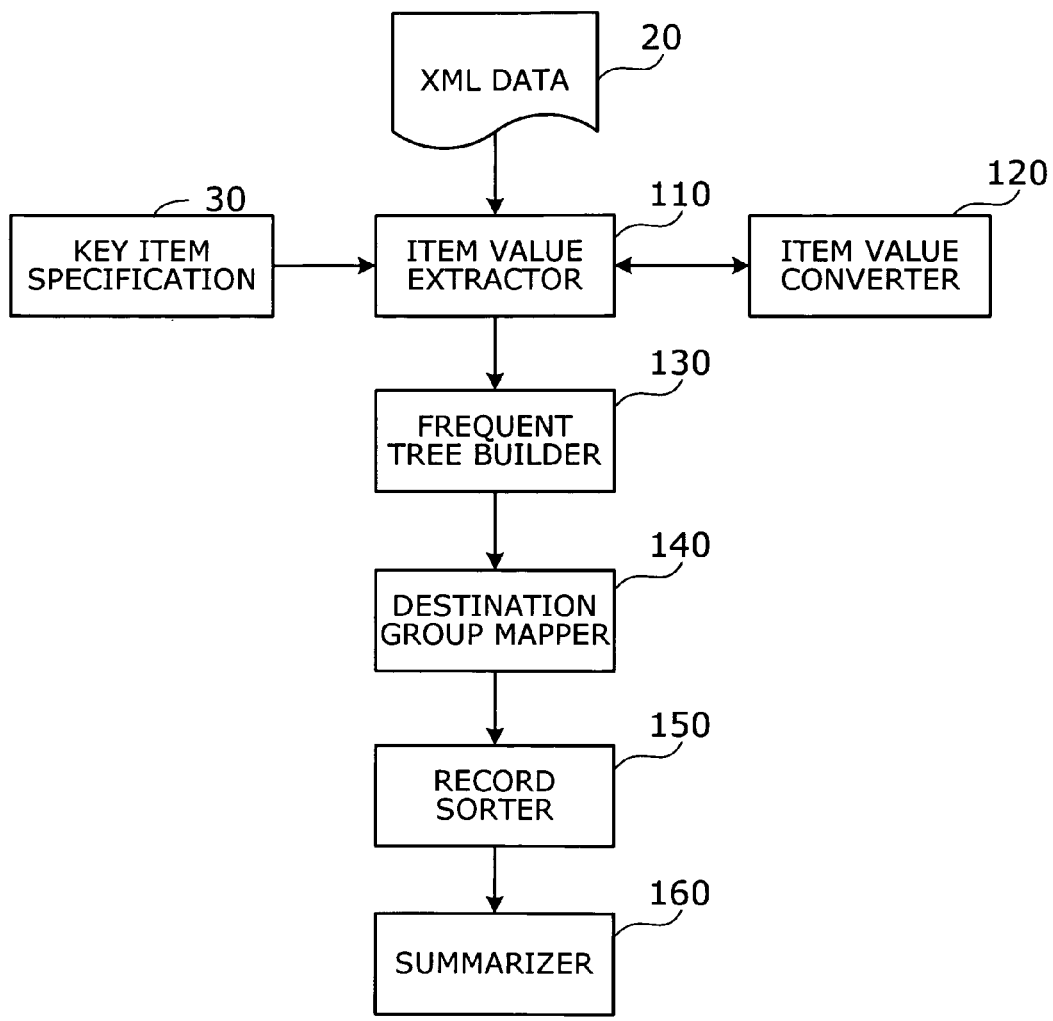
FIG. 3 is a block diagram showing functions of a data summarizing device 100 according to the present embodiment.

FIG. 3 is a block diagram showing functions of the data summarizing device 100 according to the present embodiment. This data summarizing device 100 includes an item value extractor 110, an item value converter 120, a frequent tree builder 130, a destination group mapper 140, a record sorter 150, and a summarizer 160.

The item value extractor 110 extracts the values of items specified by a given key item specification 30 from XML data 20 and produces a list of key item values for every record. The key item specification 30 is a collection of data names (i.e., key items) indicating which items are to be summarized. The user specifies those key items as he/she desires.

The item value converter 120 converts some extracted item values according to a specified algorithm. For example, when summarizing dataset records in order of age of users, the last digit of each user's age is rounded down to "0" (e.g., an age value of "31" is rounded down to "30"). This conversion makes it easy to summarize data in different age brackets (e.g., teens, twenties, thirties, and so on).

With the resulting item value lists of records, the frequent tree builder 130 constructs a frequent tree involving all values of leading items that appear as often as a predetermined number of times. Each edge (or link) of the frequent tree corresponds to a particular item value, and the number of its occurrences is set to the corresponding node. The frequent tree builder 130 constructs such a frequent tree in an approximative manner while reading item value lists of records sequentially.

The destination group mapper 140 associates each node of the resulting frequent tree with a destination group according to the number of occurrences. The record sorter 150 compares the item value list of each given record with the frequent tree, thereby determining which node each record can reach. The record sorter 150 then assigns the record to a destination group associated with the node where the record has reached.

The summarizer 160 summarizes item values of the sorted records and outputs the result. The summarization may be performed in a sequential or parallel fashion by using a single computer. Or alternatively, a plurality of computers may be employed to process divided data in a distributed manner. Each summarization result of divided data may be output as is, or may be merged with other results to form a unified summary report.

The following section will now describe the operation of the data summarizer device 100 more specifically, with a focus on how it builds a frequent tree by way of approximation.

Building Frequent Tree

FIG. 4 shows an example of XML data. In this example, the XML data 20 shows a plurality of sales records 21, 22, . . . of personal-computer related products sold in home-appliance stores of a nationwide mass-merchandiser chain. Each record 21, 22, . . . is put between a pair of sales information tags, <sales information> and </sales information>.

Figure 5:
FIG. 5 shows an example of a key item specification.

FIG. 5 is an example of a key item specification. The illustrated key item specification 30 includes the following three key items represented as absolute location paths (i.e., path from the topmost item to a particular key item in a document structure):

[Key item #1]
   Sales_management/Sales_information/Customer/Age
[Key item #2]
   Sales_management/Sales_information/Customer/Sex
[Key item #3]
   Sales_management/Sales_information/Customer/Address/District The key items are prioritized in an appropriate order for the purpose of judgment in constructing a frequent tree. In the present example, the first-listed key item has a higher priority in the key item specification 30. That is, the key items #1, #2, and #3 are prioritized in that order.

Figure 6:
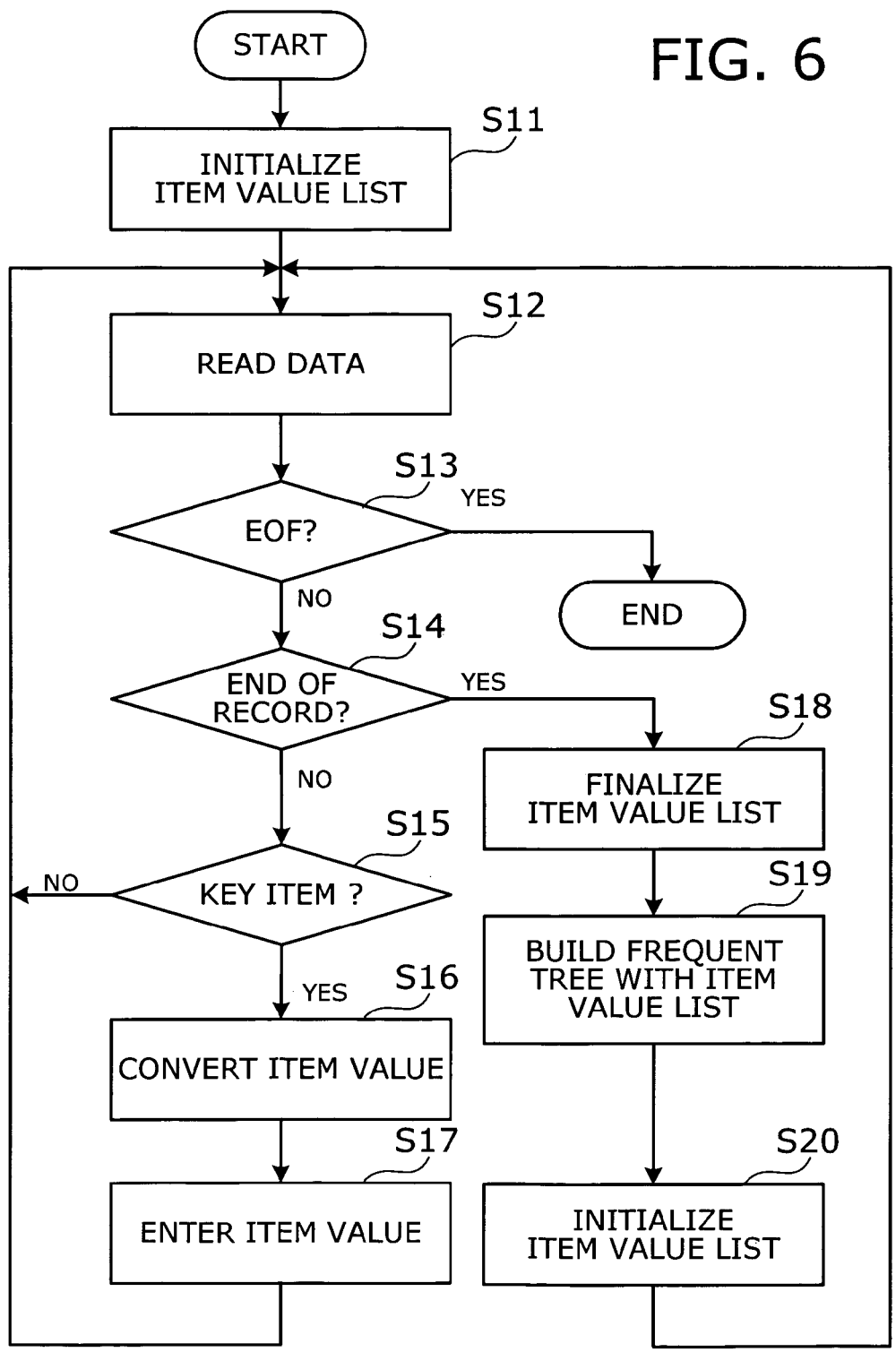
FIG. 6 shows a flowchart of a process of producing item value lists.

A data summarization process is invoked when the above XML data 20 and key item specification 30. The process begins with producing item value lists. FIG. 6 shows a flowchart of this process, which includes the following steps:

[Step S11] The item value extractor 110 initializes an item value list, which is supposed to contain the values of specified key items found in each record 21, 22, . . . of the XML data 20. The initialization step reserves a storage area for an item value list in the item value extractor 110. More specifically, a part of the RAM 102 is allocated for this purpose.

[Step S12] The item value extractor 110 sequentially reads the XML data 20 line by line from the topmost part.

[Step S13] The item value extractor 110 determines whether it has reached the EOF (End Of File) of the XML data 20 and has thus failed to read a new line in Step S12. If so, the application 110 exits from the present process. If not, the process proceeds to Step S14 with a new line read in Step S12.

[Step S14] The item value extractor 110 determines whether the data read in Step S12 indicates the end of the record. In the present embodiment, the closing tag </sales information> marks the end of the present record. If this tag is read, the process proceeds to Step S18. If the read data is not the closing tag, the process advances to Step S15.

[Step S15] The item value extractor 110 determines whether the read data is a key item. In the present embodiment, it is tested whether the read data is a key item included in the key item specification shown in FIG. 5. More specifically, the data will be identified as [key item #1] if it contains an <age> tag, which is a low-order element that falls under the <sales management>, <sales information>, and <customer> tags. The data will be identified as [key item #2] if it contains a <sex> tag, which is another low-order element of the same. The data will be identified as [key item #3] if it contains an <address> tag, which is yet another low-order element of the same. If the read data is one of those key items, the process proceeds to Step S16. If not, the process proceeds to Step S12.

[Step S16] The item value converter 120 converts the value of the present item if it is necessary. In the present embodiment, the item value converter 120 changes the least significant digit of "age" to zero so as to summarize data records in order of age. More specifically, the item value converter 120 replaces age values between 10 and 19 with 10, and those between 20 and 29 with 20, thereby sorting the corresponding records into different age brackets.

[Step S17] The item value converter 120 enters the resulting item value into the item value list. The process then returns to Step S12.

[Step S18] Now that the end of record is detected, the item value extractor 120 finalizes the item value list. At this time point, the item value list is supposed to contain all specified key items in order of priority (i.e., in order in which they appear in the key item specification 30 shown in FIG. 5). In the case where the record has no value for some key item, the item value extractor 110 puts a null character (for example, "?") into that data field. If, on the other hand, the record contains a plurality of values corresponding for a key item, the item value extractor 110 creates a plurality of item value lists to store all those values as different combinations of item values. In this case, a plurality of item value lists are produced from one record.

[Step S19] The item value extractor 110 supplies the finalized item value list to the frequent tree builder 130 to invoke a process of constructing a frequent tree in an approximative manner.

[Step S20] The item value extractor 110 reinitializes the item value list and returns to Step S12. Note that the previous values of the item value list are held in the frequent tree builder 130, which has been triggered in Step S19.

The above process creates an item value list for every record, and such item value lists are used to construct a frequent tree.

Referring to the XML data 20 of FIG. 4 and the key item specification 30 of FIG. 5, the following section will describe how item value lists are created from the XML data 20.

The item value extractor 110 sequentially reads the XML data 20, beginning with its very first line. The first five lines of the XML data 20 are skipped because they do not coincide with the specified key items. The item value extractor 110 then reads the sixth line, which reads: "<district>Yamaguchi </district>". This item is located below <address>, which is reached by tracing the record structure from <sales management> at the topmost place and going down to <sales information> and then to <customer>. In this sense, <district> is a low-order structural element of <customer>. Since the item name <district> coincides with "Key item #3," the item value extractor 110 stores its value "Yamaguchi" into the item value list.

Then, the item value extractor 110 sequentially reads the seventh and subsequent lines. The lines up to the eighth line are skipped because they are not specified as key items. Upon reading the ninth line, the item value extractor 110 recognizes that its item name coincides with "Key item #1," thus saving its value "38" in the item value list. Further, the tenth line is read. Since its item name coincides with "Key item #2," the item value extractor 110 stores the item value "male" is stored in the item value list. The item value extractor 110 then skips the eleventh to fifteenth lines since they do not match with the specified key items.

At the sixteenth line, the item value extractor 11 determines that the end of the present record is reached. The item value extractor 110 thus arranges the extracted key items of the record in the specified order (in the present example, "Key item #1", "Key item #2", and then "Key item #3"). As a result, the following item value list is created:

[38, male, Yamaguchi]

Some item values are subjected to the item value converter 120. In the present example, the item value converter 120 changes the age value of "38" of the first record 21 to "30" to put it into a corresponding age bracket, thus resulting in the following item value list:

[30, male, Yamaguchi]

The item value list of every record is transferred to the frequent tree builder 130 each time it is produced.

Figure 7:
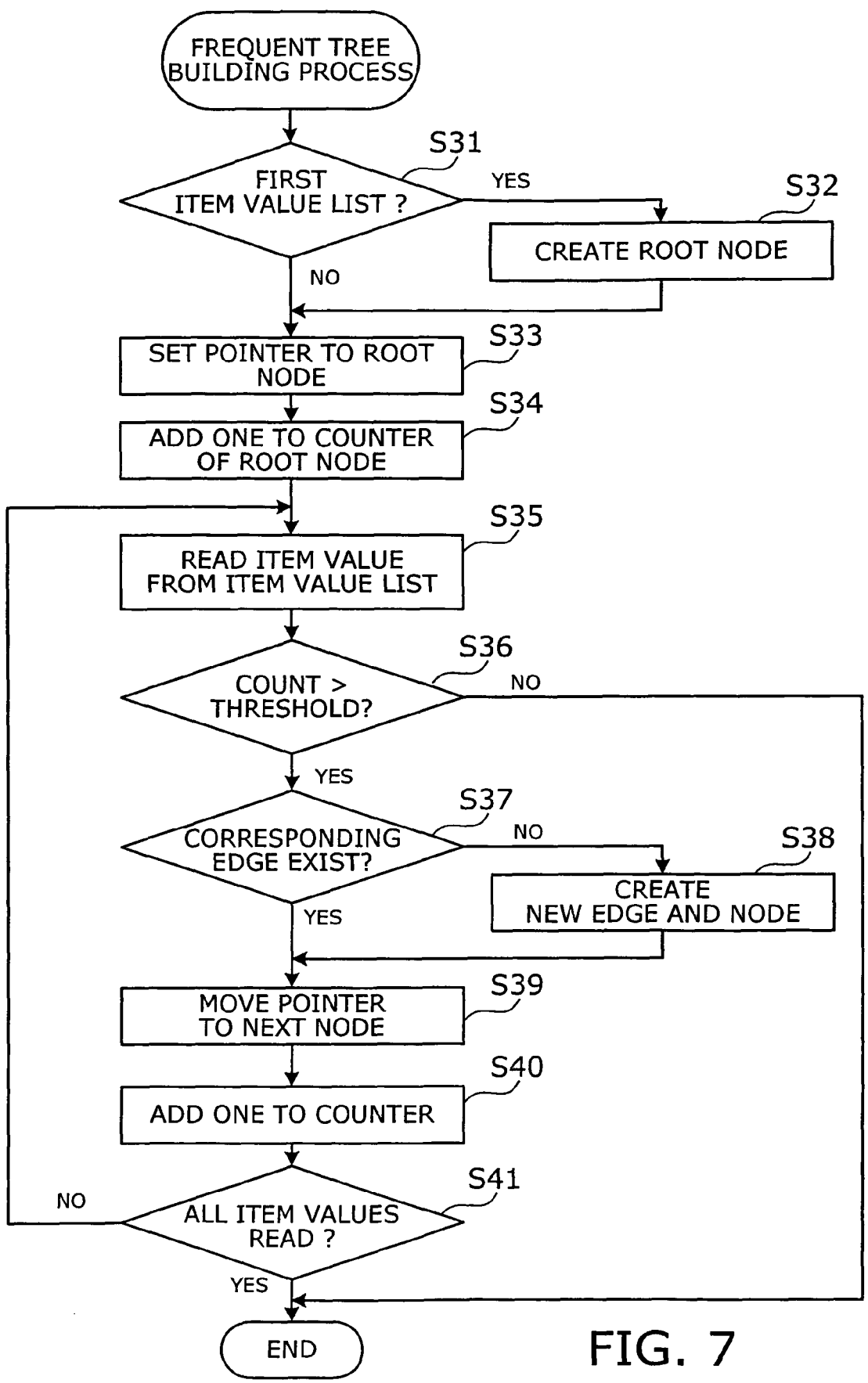
FIG. 7 shows a flowchart of a process of constructing a frequent tree in an approximative manner.

FIG. 7 shows a flowchart of a process of constructing a frequent tree in an approximative manner. In constructing a frequent tree, the frequent tree builder 130 invokes this process each time an item value list is fed from the item value extractor 110. The process includes the following steps:

[Step S31] The frequent tree builder 130 determines whether the given item value list is the very first list created by the item value extractor 110. If it is, the process proceeds to Step S32. If not, the process proceeds to Step S33.

[Step S32] The frequent tree builder 130 creates a root node of a new frequent tree. The root node has its associated counter, and in this step, a predetermined growth rate parameter (threshold value for use in creating nodes) is set to the counter as an initial value. Its purpose is to prevent data from being discarded unnecessarily until the count value exceeds the threshold value.

[Step S33] The frequent tree builder 130 sets a node pointer to the root node. This pointer will be used to point at a particular node of the frequent tree.

[Step S34] The frequent tree builder 130 adds one to the counter of the root node.

[Step S35] The frequent tree builder 130 reads a remaining item value from the given item value list, beginning with the first entry.

[Step S36] The frequent tree builder 130 determines whether the count value of a node indicated by the node pointer is larger than the threshold value. If the count value exceeds the threshold, the process proceed to Step S37. If not, the process terminates itself.

[Step S37] The frequent tree builder 130 determines whether there is an edge (a link between nodes) corresponding to the item value read out of the list. If such an edge exists, the process proceeds to Step S39. If not, the process proceeds to Step S38.

[Step S38] The frequent tree builder 130 creates a new node and a new edge and associates the item value with that edge. The node pointer is now moved to the new node.

[Step S39] The frequent tree builder 130 moves the pointer to the destination node of the edge found in Step S37.

[Step S40] The frequent tree builder 130 adds one to the counter associated with the current node (i.e., the node currently pointed by the node pointer).

[Step S41] The frequent tree builder 130 determines whether all items values have been read. If so, the process is terminated. If any remaining item values exist, the process returns to Step S35.

The message parser 130 creates a new frequent tree by performing the above steps with all item value lists generated by the item value extractor 110.

The following will describe how a frequent tree is created from the XML data 20 of FIG. 4 and the key item specification 30 of FIG. 5. It is assumed that the threshold for creating nodes is set to 50.

Figure 8:
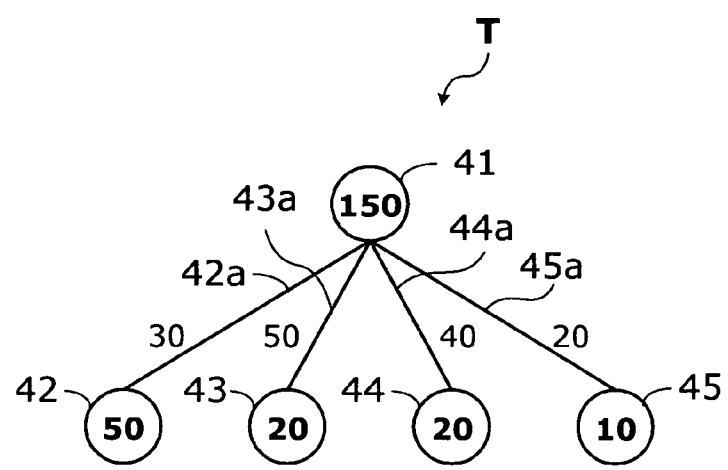
FIG. 8 shows a frequent tree under construction.

FIG. 8 shows a frequent tree under construction. This frequent tree T is made up of nodes 41 to 45 and edges 42a, 43a, 44a, and 45a between them. The node 41 is the root node and other nodes 42 to 45 form a lower-level structure under the node 41. In the present embodiment, the frequent tree T is expressed as a trie structure with edges having a length of two bytes. (This particular length applies when the edge values are written in Japanese. In the accompanying drawings, the edge values are transliterated into English letters, hence different lengths.) A specific item value is associated with each of those edges 42a, 43a, 44a, and 45a. For example, different values of item "age" specified as the topmost key item "Key item #1" are associated with the edges 42a, 43a, 44a, and 45a extending from the root node 41.

Also, a counter is set to each of the nodes 41 to 45. The count value of a node approximately represents the number of occurrences of a particular combination of item values on the path from the root node to that node. The counter of each node 41 to 45 is given an initial value when its is produced. Specifically, the threshold value ("50" in the present embodiment) is set to the root node 41. The other nodes 41 and 45 start with a value of "0" as their initial count values.

FIG. 8 shows a state of the frequent tree at the point where 100 item values lists have been produced form given 100 records. Therefore, the count value of the root node 41 is "150" (initial value+the number of item value lists). Since the node pointer moves from the root node 41 to a different node depending the contents of a given item value list, the child nodes 41 to 45 have different count values, while their sum is "100," the number of processed records.

No lower-level nodes have been created below the nodes 41 to 45, and the node pointer is not allowed to go further, their respective counters reach the threshold of "50." In the case shown in FIG. 8, none of the nodes, except the root node 41, have a count value exceeding the threshold.

Suppose now that the following item value list is given as the 101st record.

[30, Male, Tokyo]

According to the flowchart of FIG. 7, the counter of the root node 41 is incremented by one when the node pointer is reset to that node. The counter thus indicates "151" (the number of item value lists+initial value).

Then the first element with a value of "30" is read out of the given item value list. Here, the count value of the root node 41 is larger than the threshold of 50 and there is an edge with a value of "30" in the frequent tree T. The node pointer then moves along this edge "30" to its destination node 42. The counter of the node 42 pointed by the node pointer is incremented, resulting in a new count value of "51."

The second element with a value of "male" is read out of the item value list. The count value in the current node 42 is "51," which is larger than the threshold. Since there are no edges with a value of "male," a new edge and a new node are formed for that value. The node pointer then moves to the newly created node and its count value is set to one.

The third element read out of the item value list is "Tokyo." However, the count value of the current node is "1," which is below the threshold. Therefore, the processing is terminated here.

Figure 9:
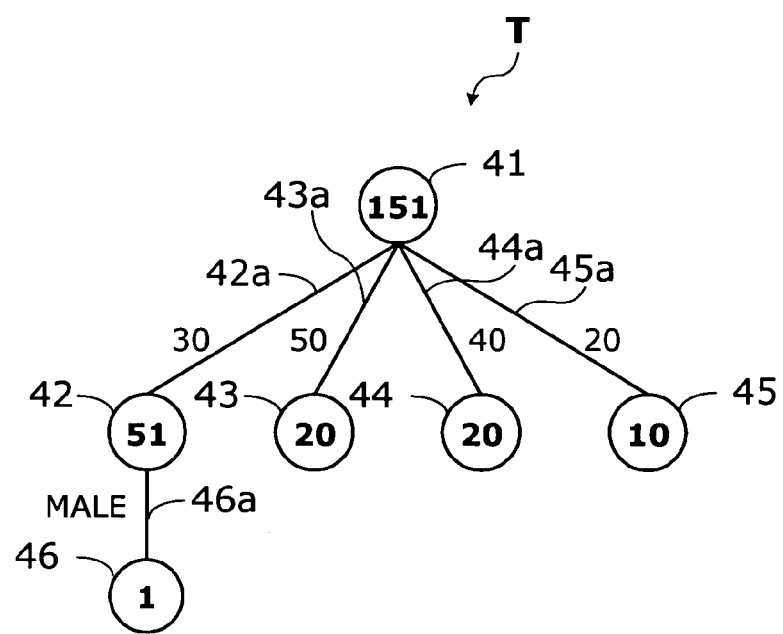
FIG. 9 shows a frequent tree obtained when the 101st record has been read.

FIG. 9 shows a state of the frequent tree T when the 101st record has been added. As can be seen from FIG. 9 in comparison with the state shown in FIG. 8, a new edge 46a with a value of "male" is connected to the node 42, and a new node 46 has been created at the other end of the edge 46a. Also, the counters of the nodes 41 and 42 are incremented by one, and the counter of the node 46 is set to one.

The operations described above are performed repeatedly until the frequent tree T takes in the item value list of the last record. That is, the frequent tree T is completed when all item value lists are processed.

Figure 10:
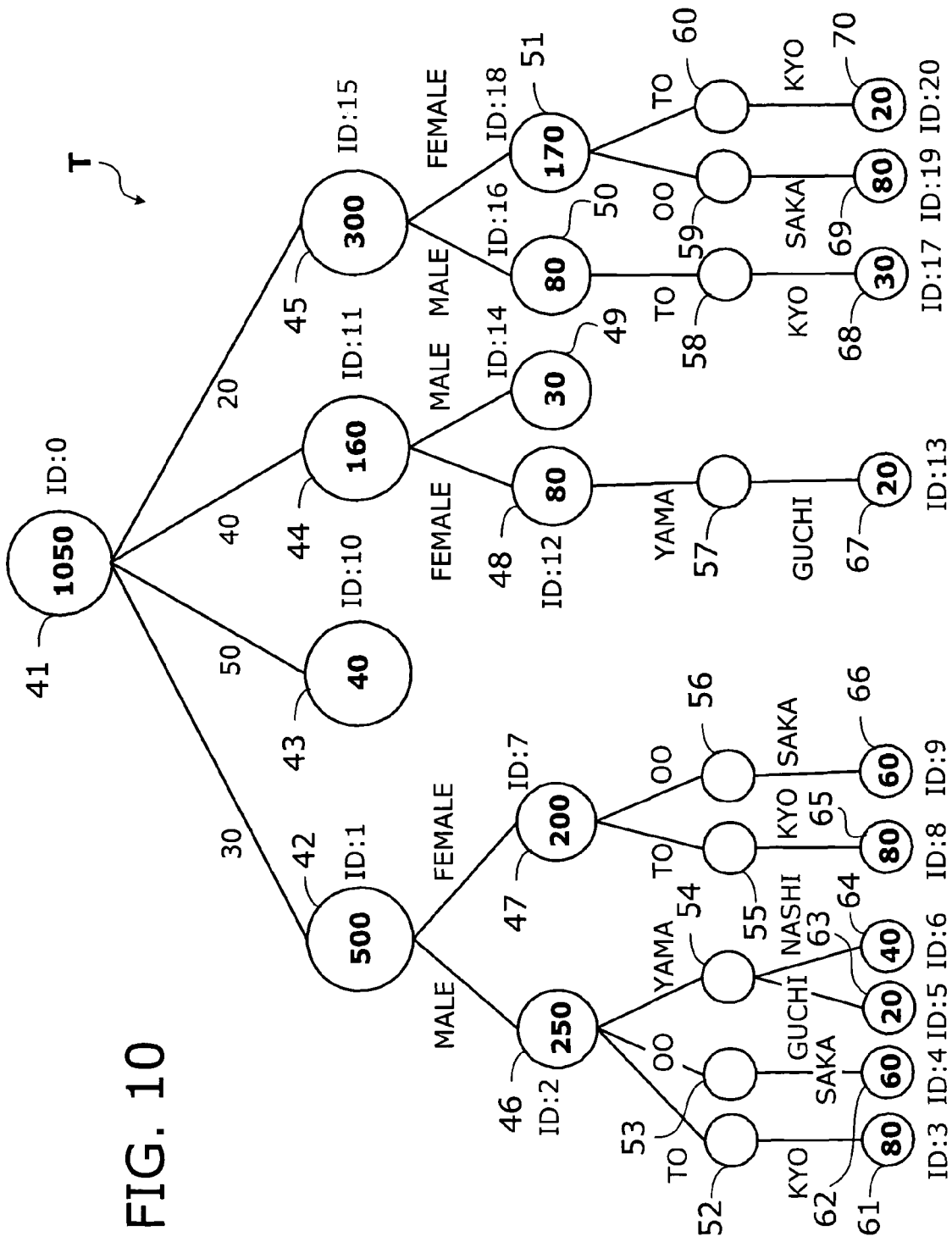
FIG. 10 shows a complete frequent tree.

FIG. 10 shows the final state of the frequent tree T. A unique node ID (identifier) is assigned to each node 41 to 70 making up the completed frequent tree T. Some nodes 52 to 60 have no count values, nor node IDs. This is because the edges those nodes 52 to 60 only indicate the first (Japanese) character of their item <district> and, therefore, the count values held in their respective destination nodes 61 to 70 would suffice for checking how often each item value appears.

The constructed frequent tree T is then used to define destination groups. This is done by associating the nodes with different destination groups in a manner in which records will be divided as equally as possible.

Mapping Destination Groups

Figure 11:
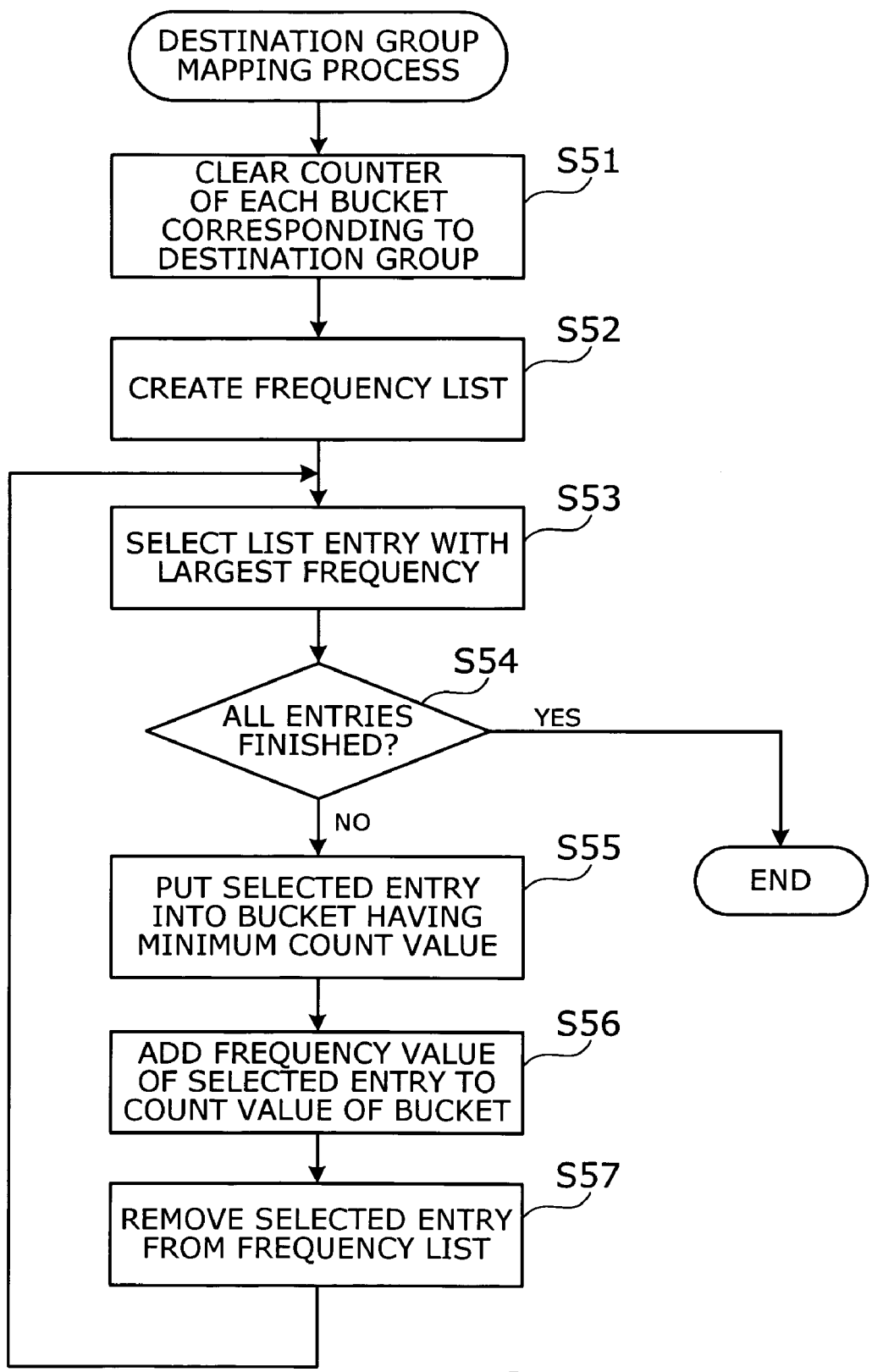
FIG. 11 shows a flowchart of a process of determining destination groups.

FIG. 11 shows a flowchart of a process of determining destination groups. This process includes the following steps:

[Step S51] The destination group mapper 140 prepares a predefined number of buckets corresponding to destination groups and sets a counter to each bucket with an initial value of "0."

[Step S52] The destination group mapper 140 creates a frequency list. The frequent list stores combinations of a node ID and a count value, where the node ID represents each particular leaf node of the frequent tree T, and its corresponding count value will show how many records fall under that leaf node.

[Step S53] The destination group mapper 140 selects a list entry having the largest frequency (count value).

[Step S54] The destination group mapper 140 determines whether all list entries have already been finished (or whether there is an entry that should be selected) when performing Step S52. If all list entries have been finished, then the process is terminated. If there is an unfinished entry, the process proceeds to Step S55.

[Step S55] The destination group mapper 140 puts the selected list entry into a bucket having a minimum count value.

[Step S56] The destination group mapper 140 adds the frequency value (count value) of the selected list entry to the count value of the bucket.

[Step S57] The destination group mapper 140 deletes the list entry selected in Step S53 from the frequency list. After that, the process proceeds to Step S53.

Every entry of the frequency list is assigned to either bucket in this way. That is, the list entries are transferred to buckets in descending order of their frequency values, in which the decision of a destination bucket is made on the basis of which bucket is the smallest in count values at the moment (i.e., depending on the total number of list entries stored so far).

Think of a case where the records are supposed to be divided into three destination groups. First, the following frequency list is created from the frequency tree T:

[(3, 80), (4, 60), (5, 20), (6, 40), (8, 80), (9, 60), (10, 40), (13, 20), (14, 30), (17, 30), (19, 80), (20, 20)]

In this frequency list, the information enclosed in parentheses is a unit to be selected as a list entry to be selected. The numeral on the left is a node ID, and the numeral on the right is a count value corresponding to the list entry.

The processing according to the flowchart of FIG. 11 yields the following results:

Bucket #1 (count value=190): [(3, 80), (4, 60), (14, 30), (5, 20)]
Bucket #2 (count value=190): [(8, 80), (9, 60), (17, 30), (13, 20)]
Bucket #3 (count value=180): [(19, 80), (6, 40), (10, 40), (20, 20)]

Figure 12:
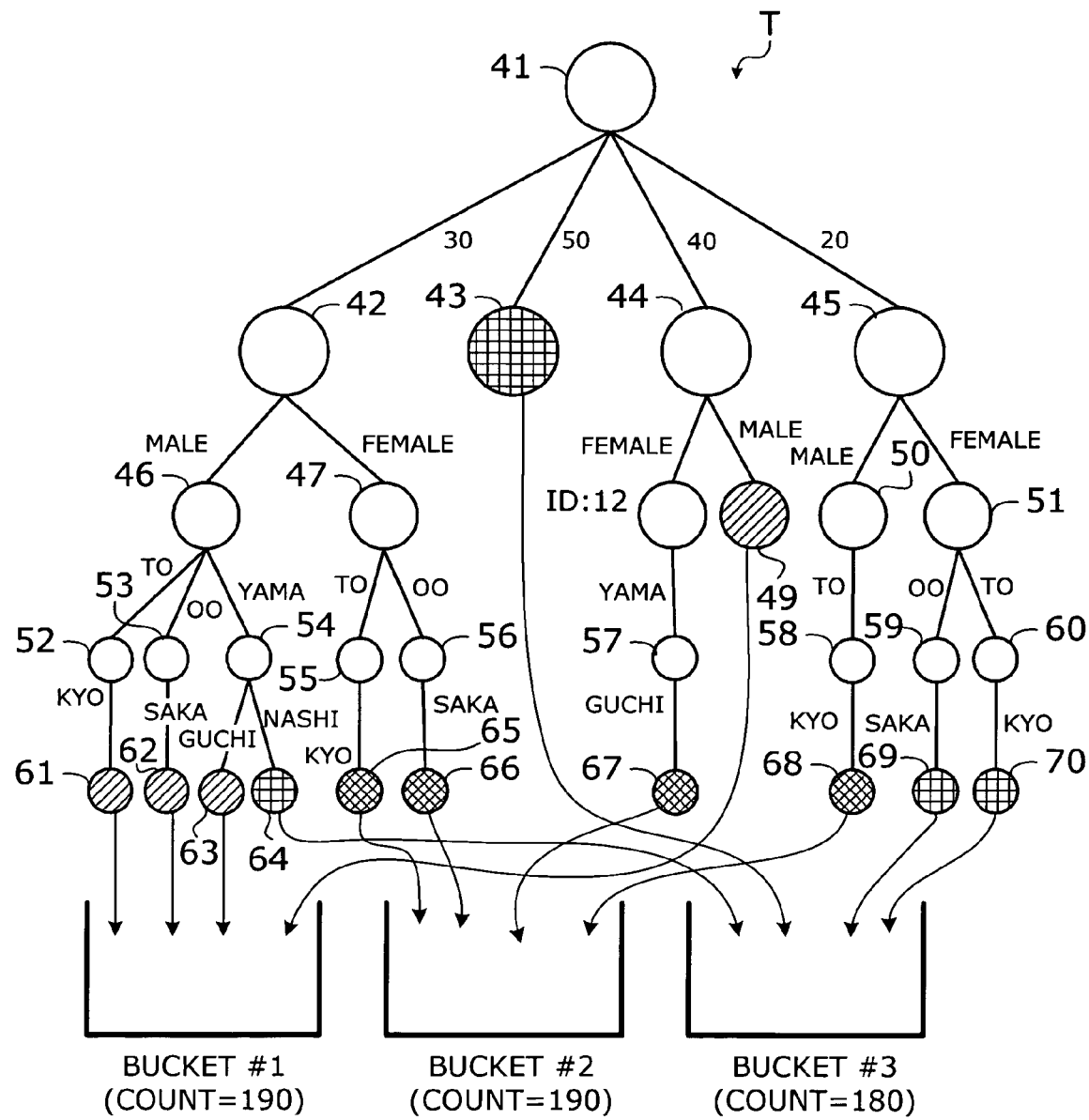
FIG. 12 shows a mapping between leaf nodes of a frequent tree and destination groups.

FIG. 12 shows a mapping between leaf nodes of the frequent tree T and destination groups. Nodes 49, 61, 62, and 63 hatched with oblique lines are associated with Bucket #1. Another set of nodes 65, 66, 67, and 68 hatched with diagonal cross lines are associated with Bucket #2. Yet another set of nodes 43, 64, 69, and 70 hatched with a grid pattern are associated with Bucket #3.

Sorting Dataset Records

Subsequently the record sorter 150 traces the frequent tree T according to the item value list of each record, traveling along the edges from the root node 41 toward a leaf node. When a particular node is reached, the record sorter 150 assigns the record to a bucket serving as a destination group associated with that node.

Figure 13:
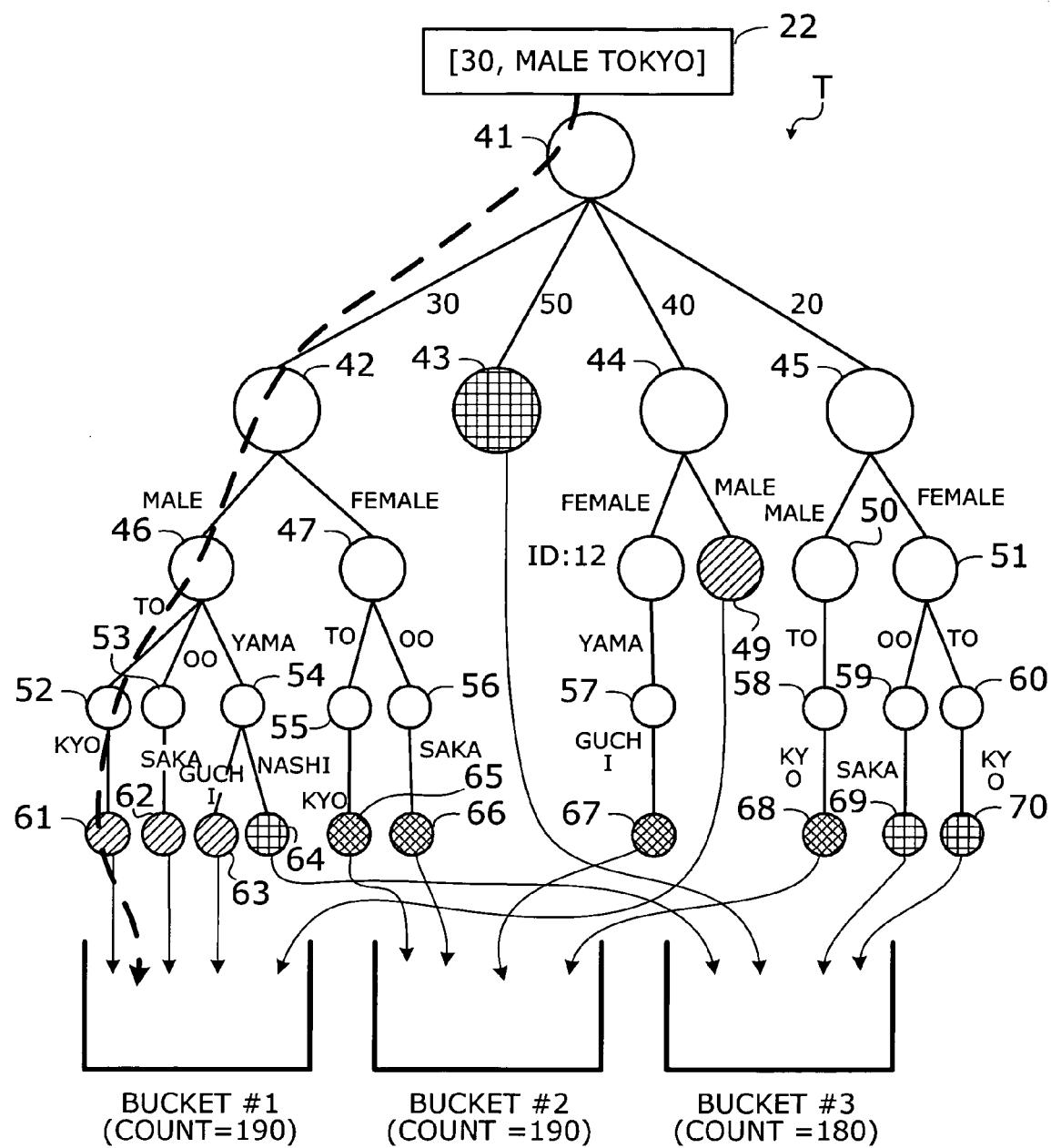
FIG. 13 shows a first example of record sorting.

FIG. 13 shows a first example of record sorting. This is an example in which the record 22 contained in the XML data 20 shown in FIG. 4 is analyzed with the frequent tree T. The item value list of this record 22 contains the following elements:

[30, male, Tokyo]

In this case, the record 22 goes through the nodes 42, 46, and 52 in that order and finally reaches the leftmost leaf node 61. Since the destination group of the node 61 is Bucket #1, the record 22 is sorted into the Bucket #1.

Figure 14:
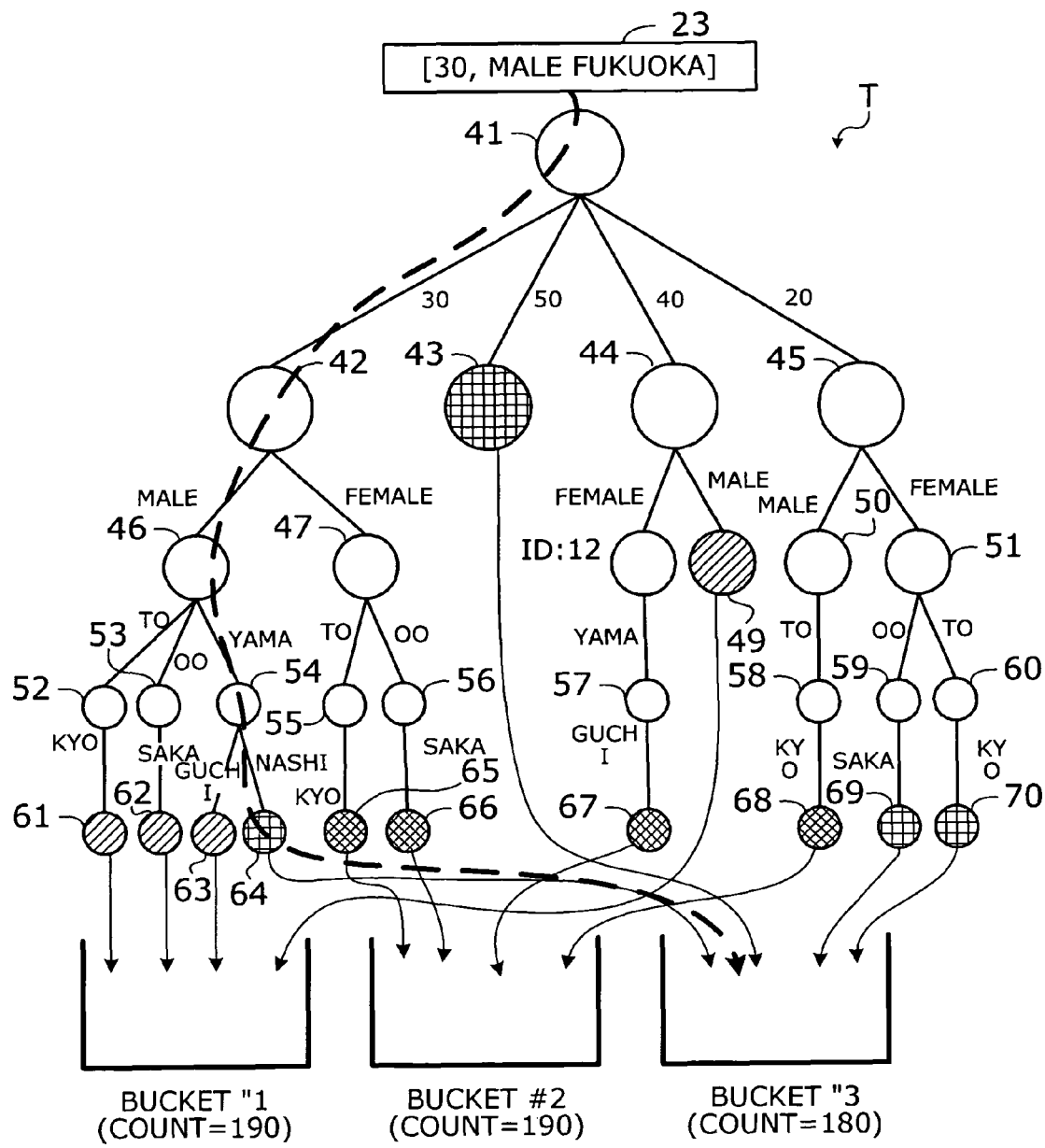
FIG. 14 shows a second example of record sorting.

FIG. 14 is a second example of record sorting. Suppose that the following item value list 72 is created from a record 23.

[30, Male, Fukuoka]

When this item value list is given, the record sorter 150 can reach the nodes 42 and 46 according to the item values "30" and "male" of the record 23. However, the frequent tree T offers no further edges or nodes for the subsequent item value "fukuoka." The current node 46 has its subordinate tree structure formed from nodes 52 to 54 and leaf nodes 61 to 64. The record sorter 150 then examines this partial tree and thus assigns the record 23 to a bucket (destination group) having the smallest count value among those associated with the leaf nodes 61 to 64.

In this example, three leaf nodes 61 to 63 are associated with Bucket #1. The next leaf node 64 is associated with Bucket #3. The count value of Bucket #1 is "190," whereas the count value of Bucket #3 is "180." That is, Bucket #3 has a smaller count value than Bucket #1, and thus the item value list 72 is assigned to Bucket #3.

While in the present example, a record destination group is determined at the time of record sorting, there is an alternative way. That is, non-leaf nodes may be associated with particular destinations, when destination groups, or buckets, are defined. More specifically, the destination group mapper 140 compares leaf nodes of a partial tree that lies below a non-leaf node. It then finds a leaf node with the smallest count value and assigns the non-leaf node to the bucket corresponding to that smallest-count leaf node.

The operations described above are performed repeatedly until the record sorter 150 assigns the last record to a bucket. Preferably the sorted records are stored in the form of, for example, CSV (Comma Separated Value) files, rather than XML files as in the input data, to facilitate subsequent tasks of data summarization.

Figure 15:
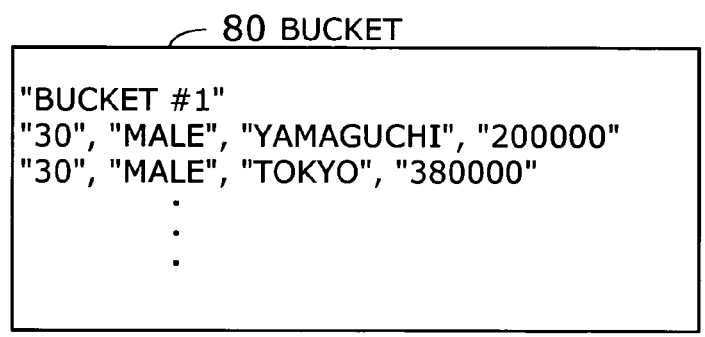
FIG. 15 shows an example of a bucket storing records in the CSV (Comma Separated Value) format.

FIG. 15 shows an example of a bucket storing records in the CSV format. The illustrated bucket 80 contains the following records:

"30", "Male", "Yamaguchi", "200000"
"30", Male", "Tokyo", "380000"

Finally, such records are subjected to the summarizer 160. The summarization processing is performed on the records in a plurality of buckets. For example, the sales records shown in the XML data 20 of FIG. 4 can be summarized for each age bracket, each sex, or each store location. The summarization is performed on a bucket-by-bucket basis. The summarization results of each bucket may be output as they are or may be compiled into a summary table or the like.

While the source records are given in the form of XML data in the above example, they may be supplied in another data format. For example, the data summarizing device 100 can handle any data formats such as RDB and CSV so long as it can extract key item values.

While the foregoing embodiments have assumed a fixed threshold of count values for use in determining whether to create a child node, the present invention should not be limited to this implementation. The proposed data summarizing device 100 may also be configured to change the threshold dynamically. More specifically, according to the progress of construction of a frequent tree T, the threshold value can be dynamically increased. This prevents the frequent tree T from growing too much. The following paragraphs will present an example of calculation of threshold values.

First Example of Dynamic Threshold Calculation

Threshold values can be defined in a domain of an appropriate parameter that increases monotonously as the frequent tree grows with time. The parameter may be, for example, the number of records that have been read and the number of nodes that have been produced. In this case, the threshold will be given as a function that takes natural number values in a natural number domain. For example, the threshold function may be: a non-negative polynomial function, an exponential function, a trigonometric function, or a step function (limited to natural numbers). The following examples show specific calculations.

Proportional Threshold $$f(n)=an+b (a>0, b\geq 0) \qquad (1)$$

where n (natural number) denotes the number of records or nodes, f denotes a growth rate function, and a and b are predefined constant values. According to this equation, the growth rate increases in proportion to the number of records processed or the number of nodes created.

Exponential Threshold $$f(n)=c \cdot a^n + b (a>0, b\geq 0, c>0) \qquad (2)$$

where a, b, and c are predefined constant values. According to this equation, the growth rate increases exponentially with the number of records processed or the number of nodes created. The exponential threshold works very effectively because it dramatically reduces the growth rate of a frequent tree in the case the program runs for a long time.

Second Example of Dynamic Threshold Calculation

Alternatively, threshold values may be defined in a domain of a parameter that is peculiar to each individual node, such as the depth of nodes or characters representing a node. The foregoing equation (1) or (2) can also be used as a natural-number function for determining a threshold. In this case, the parameter n represents the depth of nodes. For example, when equation (1) is used, the growth rate increases in proportion to the current node depth of the frequent tree under construction. In the case the equation (2) is used, the growth rate of a frequent tree is dramatically reduced as its node depth becomes larger.

Yet another method of determining a threshold is a function table that associates each alphabet with a natural number. The use of a function table based on the statistics of natural language makes it possible, to control the growth rate of a frequent tree depending what characters are read. Moreover, a special symbol "@" that gives a threshold of zero, i.e., f(@)=0, will enable a particular character string to be handled as a single complete. For example, an item value "TokyoTo" will be added to the frequent tree instantly as a new path if it is rewritten to "(@_To)(@_Kyo)To."

As can be seen from the above, the present embodiment builds a frequent tree T in an approximative way from key item values, thus making it possible to analyze the distribution of dataset records in terms of the specified key items. The frequent tree T is used to determine to which bucket (i.e., destination group) each record should be directed, according to key item values of the record. The proposed method can sort out dataset records at low costs.

The present embodiment also ensures that records having the same key item values are sorted into the same destination group since only one bucket can be associated with each node of the frequent tree T. Since the sorting is based on item value lists created for every record, the proposed method can sort various records with different kinds of data structure, as long as their record structure can be identified and their individual item values can be extracted.

Note that the constructed frequent tree T is reusable. That is, the same past frequent tree T can be used for a new data records that are added. In this case, those new records are allowed to skip the frequent tree builder 130 and destination group mapper 140, and they are sorted into appropriate destination groups by using the past frequent tree. The use of past frequent trees T contributes more to data sorting at low processing costs.

According to the present embodiment, a frequent tree T is constructed in an approximative manner only by feeding a series of item value lists of records. There is no need to scan the given dataset more than once. This enables high speed construction of a frequent tree without spending much memory resources.

Also, the approximative construction of a frequent tree is achieved by reading item value lists sequentially, meaning that it is possible to update such frequent trees in an incremental way. That is, a past frequent tree is used as initial tree, and the item value lists of additional records are incorporated into the past frequent tree. The cost of frequent tree construction is reduced by reusing frequent trees formed in the past.

While the foregoing embodiment has a function of converting individual age values into corresponding age brackets, the conversion functions should not limited to this specific example. Another possible conversion is compression of item values (for example, truncating lower digits of an item value), pre-categorization of item values (for example, changing specific values of "Address" to "East district", "Central district", or "West district") are available. Such pre-processing functions makes it easy to sort and summarize data records.

The records sorted into buckets in the above-described way are then summarized on an individual bucket basis. Because there is no need to merge data across the buckets, summarization processing can be achieved at low costs.

Computer-Readable Media

The above-described processing functions can be implemented on a computer with instructions being encoded and provided in the form of computer programs. A computer system executes such programs to provide the intended functions of the present invention. For the purpose of storage and distribution, the programs may be stored in a computer-readable storage medium. Suitable computer-readable storage media include magnetic storage media, optical discs, magneto-optical storage media, and semiconductor memory devices. Magnetic storage media include hard disk drives (HDD), flexible disks (FD), and magnetic tapes. Optical disc media include digital versatile discs (DVD), DVD-RAM, compact disc read-only memory (CD-ROM), CD-Recordable (CD-R), and CD-Rewritable (CD-RW). Magneto-optical storage media include magneto-optical discs (MO).

Portable storage media, such as DVD and CD-ROM, are suitable for the distribution of program products. Network-based distribution of software programs is also possible, in which case several master program files are made available on a server computer for downloading to other computers via a network. A user computer stores necessary programs in its local storage unit, which have previously been installed from a portable storage media or downloaded from a server computer. The computer executes the programs read out of the local storage unit, thereby performing the programmed functions. As an alternative way of program execution, the computer may execute programs by reading out program codes directly from a portable storage medium. Another alternative method is that the user computer dynamically downloads programs from a server computer when they are demanded and executes them upon delivery.

CONCLUSION

According to the present invention, simplified frequent trees are formed on a basis of a leading item value which occurs the number of times more than specified by a growth rate parameter out of leading item values showing an arrangement of an item value of a key item of each record and according to a place where transition takes place occurring when records are changed along the frequent trees, records are assigned to destination groups.

As a result, it is made possible to effectively perform processing of data summarizing division in which records having the same item values of a key item are divided to the same destination group.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable storage medium storing a dataset sorting program to sort records in a dataset into a plurality of destination groups, the dataset sorting program causing a computer to function as:
   an item value extractor that creates an item value list of each record of the dataset by extracting item values of key items specified by a key item specification, the item value list containing the item values arranged in the order specified by the key item specification;
   a frequent tree builder that finds, in the plurality of item value lists, patterns of item values that appear more often than a threshold specified by a growth rate parameter, the patterns each being a leading part of an item value list with a variable length, and builds a frequent tree representing each found pattern of item values as a series of nodes linked in the same order as the item values are arranged in said each found pattern;
   a destination group mapper that associates each node of the frequent tree with one of the plurality of destination groups; and
   a record sorter that traces the frequent tree according to the item value list of each given record, and upon reaching a particular node, puts the record into the destination group associated with that node;
   wherein:
   each node of the frequent tree under construction is associated with a counter representing how many times the corresponding pattern of item values has occurred,
   the frequent tree builder increments the counters each time a new item value list hits the corresponding nodes of the frequent tree under construction, and
   the frequent tree builder adds a new node to be directly linked to an existing node of the frequent tree to register a new item value in a given item value list which comes next to the item value corresponding to the existing node when the counter of the existing node exceeds the threshold given as the growth rate parameter, whereas the frequent tree builder neglects the new item value and subsequent item values in the given item value list when the counter of the existing node is equal to or smaller than the threshold given as the growth rate parameter.

2. The computer-readable storage medium according to claim 1, wherein said destination group mapper determines the association between the nodes and the destination groups based on the counters of the nodes, such that the destination groups will be equalized in terms of the total number of records belonging thereto.

3. The computer-readable storage medium according to claim 2, wherein said destination group mapper selects the nodes in descending order of values of the counters and assigns each selected node to the destination group whose existing member nodes have the smallest total value of the counters.

4. The computer-readable storage medium according to claim 1, wherein:
   the nodes include leaf nodes and non-leaf nodes, the leaf nodes being located at the bottommost level of the frequent tree;
   if a given record has reached one of the leaf nodes, said record sorter puts the record into a destination group associated with that leaf node; and
   if the given record has stopped at one of the non-leaf nodes, said record sorter puts the record into a destination group associated with one of the leaf nodes that can be reached from that non-leaf node.

5. The computer-readable storage medium according to claim 1, wherein said computer performs a function as an item value converting unit which converts the item value corresponding to a predetermined key item out of the item values obtained by the item value extractor according to a specified rule.

6. The computer-readable storage medium according to claim 1, wherein said frequent tree builder dynamically increases the growth rate parameter according to progress of processing of constructing the frequent tree.

7. The computer-readable storage medium according to claim 1, wherein the dataset sorting program further causing the computer to function as a summarizer that summarizes data of the records in each destination group.

8. A dataset sorting device for sorting records of a dataset into a plurality of destination groups, comprising:
   an item value extractor that creates an item value list of each record of the dataset by extracting item values of key items specified by a key item specification, the item value list containing the item values arranged in the order specified by the key item specification;
   a frequent tree builder that finds, in the plurality of item value lists, patterns of item values that appear more often than a threshold specified by a growth rate parameter, the patterns each being a leading part of an item value list with a variable length, and builds a frequent tree representing each found pattern of item values as a series of nodes linked in the same order as the item values are arranged in said each found pattern;
   a destination group mapper that associates each node of the frequent tree with one of the plurality of destination groups; and
   a record sorter that traces the frequent tree according to the item value list of each given record, and upon reaching a particular node, puts the record into the destination group associated with that node;
   wherein:
   each node of the frequent tree under construction is associated with a counter representing how many times the corresponding pattern of item values has occurred,
   the frequent tree builder increments the counters each time a new item value list hits the corresponding nodes of the frequent tree under construction, and
   the frequent tree builder adds a new node to be directly linked to an existing node of the frequent tree to register a new item value in a given item value list which comes next to the item value corresponding to the existing node when the counter of the existing node exceeds the threshold given as the growth rate parameter, whereas the frequent tree builder neglects the new item value and subsequent item values in the given item value list when the counter of the existing node is equal to or smaller than the threshold given as the growth rate parameter.

9. A method for sorting records of a dataset into a plurality of destination groups, comprising:
   creating an item value list of each record of the dataset by extracting item values of key items specified by a key item specification, the item value list containing the item values arranged in the order specified by the key item specification;
   finding, in the plurality of item value lists, patterns of item values that appear more often than a threshold specified by a growth rate parameter, the patterns each being a leading part of an item value list with a variable length;

building a frequent tree representing each found pattern of item values as a series of nodes linked in the same order as the item values are arranged in said each found pattern;

associating each node of the frequent tree with one of the plurality of destination groups; and tracing the frequent tree according to the item value list of each given record, and upon reaching a particular node, putting the record into the destination group associated with that node;

wherein said building of the frequent tree comprises:

associating each node of the frequent tree under construction with a counter representing how many times the corresponding pattern of item values has occurred, incrementing the counters each time a new item value list hits the corresponding nodes of the frequent tree under construction, and adding a new node to be directly linked to an existing node of the frequent tree to register a new item value in a given item value list which comes next to the item value corresponding to the existing node when the counter of the existing node exceeds the threshold given as the growth rate parameter, while neglecting the new item value and subsequent item values in the given item value list when the counter of the existing node is equal to or smaller than the threshold given as the growth rate parameter.

* * * * *